(12) United States Patent
Murtaza et al.

(10) Patent No.: US 12,547,578 B2
(45) Date of Patent: Feb. 10, 2026

(54) LIN BUS TRANSCEIVER AND METHOD THEREFORE

(71) Applicant: Infineon Technologies AG, Neubiberg (DE)

(72) Inventors: Diana Raluca Murtaza, Bucharest (RO); Florin-Andrei Gindac, Bucharest (RO)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 18/891,308

(22) Filed: Sep. 20, 2024

(65) Prior Publication Data

US 2025/0123993 A1    Apr. 17, 2025

(30) Foreign Application Priority Data

Sep. 26, 2023  (DE) .......................... 102023126007.3

(51) Int. Cl.
*G06F 13/14*    (2006.01)
*G06F 13/42*    (2006.01)

(52) U.S. Cl.
CPC .. *G06F 13/4282* (2013.01); *G06F 2213/0012* (2013.01)

(58) Field of Classification Search
None
See application file for complete search history.

(56) References Cited

U.S. PATENT DOCUMENTS

2012/0117287 A1* 5/2012 Kashima ................. G06F 13/36
                                                     710/110
2015/0171993 A1* 6/2015 Suzuka ............... G06F 11/0793
                                                     714/2

(Continued)

FOREIGN PATENT DOCUMENTS

CN    116827839 A    9/2023
JP    2011257265 A   12/2011

OTHER PUBLICATIONS

Road vehicles—Local Interconnect Network (LIN)—Part 6: Protocol conformance test specification. pp. 14, 15, 32, 36, 37, Norm ISO 17987-6 Oct. 1, 2016, Oct. 1, 2016.

(Continued)

*Primary Examiner* — Henry Tsai
*Assistant Examiner* — Dean Phan
(74) *Attorney, Agent, or Firm* — Mueting Raasch Group

(57) ABSTRACT

A method for a listening network node is described herein. In accordance with one embodiment, the method includes receiving data from a serial bus interface, wherein the data includes (at least) a first header of a first data frame. The method further includes detecting completion of the reception of the first header and detecting whether the data received subsequent to the first header includes a recessive bit and storing information that indicates whether or not a recessive bit has been detected. Furthermore, the method includes detecting a stop bit in the data received subsequent to the first header and, when the detection of the stop bit fails, detecting a break delimiter that indicates the end of a break field of a second header, signaling a frame error if the stored information indicates that a recessive bit has been received, and signaling a missing response if the stored information indicates that a recessive bit has not been received.

15 Claims, 3 Drawing Sheets

(56) References Cited

U.S. PATENT DOCUMENTS

2019/0165968 A1     5/2019  Nakajima et al.
2022/0046114 A1*    2/2022  Entelis .................... H04L 69/04

OTHER PUBLICATIONS

Road vehicles—Local Interconnect Network (LIN)—Part 3: Protocol specification. pp. 21-24, Norm ISO 17987-3 Aug. 15, 2016, Aug. 15, 2016.
Road vehicles—Local Interconnect Network (LIN)—Part 4: Electrical physical layer (EPL) specification 12 V/24 V. pp. 22-26, Norm ISO 17987-4 Sep. 1, 2016, Sep. 1, 2016.
Road vehicles—Local Interconnect Network (LIN)—Part 8: Electrical physical layer (EPL) specification: LIN over DC powerline (DC-LIN). pp. 53-54, Norm ISO 17987-8 2019-10-00, Oct. 2019.
Road vehicles—Local Interconnect Network (LIN)—Part 5: Application programmers interface (API). p.30, Norm ISO/TR 17987-5 Nov. 15, 2016, Nov. 15, 2016.

* cited by examiner (a) Break Field (b) Sync Byte Field

LIN BUS TRANSCEIVER AND METHOD THEREFORE

TECHNICAL FIELD

The present disclosure relates, in general, serial bus communication, in particular to an enhancement of the Local Interconnect Network (LIN) bus.

BACKGROUND

The Local Interconnect Network (also referred to as LIN bus) denotes a bus system for seral communication between a plurality of network nodes (e.g. sensors and actuators). It may be regarded as a field bus. As an industry standard, the LIN specification was developed by the LIN Consortium until 2010. It includes the physical layer, the bus protocol (layers 2-4 according to the OSI model), the interface to the application, and a uniform format for describing an entire LIN. The latest revision 2.2A of the specification was transferred to ISO and published as ISO standard 17987-1 (Road vehicles—Local interconnect network (LIN)—Part 1-8).

Semiconductor chips with an integrated LIN transceiver are commercially available. Such LIN transceivers may be used in LIN commander (master) and LIN responder (slave) network nodes.

SUMMARY

A method for a listening network node is described herein. In accordance with one embodiment, the method includes receiving data from a serial bus interface, wherein the data includes (at least) a first header of a first data frame. The method further includes detecting completion of the reception of the first header and detecting whether the data received subsequent to the first header includes a recessive bit and storing information that indicates whether or not a recessive bit has been detected. Furthermore, the method includes detecting a stop bit in the data received subsequent to the first header and, when the detection of the stop bit fails, detecting a break delimiter that indicates the end of a break field of a second header, signaling a frame error if the stored information indicates that a recessive bit has been received, and signaling a missing response if the stored information indicates that a recessive bit has not been received.

Moreover, a network node is described herein. In accordance with one embodiment, the network node includes a serial bus interface configured to receive data from a serial bus interface, wherein the received data includes (at least) a first header of a first data frame). The network node further includes a frame processor that is configured to detect the completion of the reception of the first header, to detect whether the data received subsequent to the first header includes a recessive bit and store information that indicates whether or not a recessive bit has been detected, and to detect a stop bit in the data received subsequent to the first header. Furthermore, the frame processor is configured to, when the detection of the stop bit fails, detect a break delimiter that indicates the end of a break field of a second header, signal a frame error if the stored information indicates that a recessive bit has been received, and signal a missing response if the stored information indicates that a recessive bit has not been received.

BRIEF DESCRIPTION OF THE DRAWINGS

The invention can be better understood with reference to the following drawings and descriptions. The components in the figures are not necessarily to scale; instead emphasis is placed upon illustrating the principles of the invention. Moreover, in the figures, like reference numerals designate corresponding parts. In the drawings.

DETAILED DESCRIPTION

Figure 1:
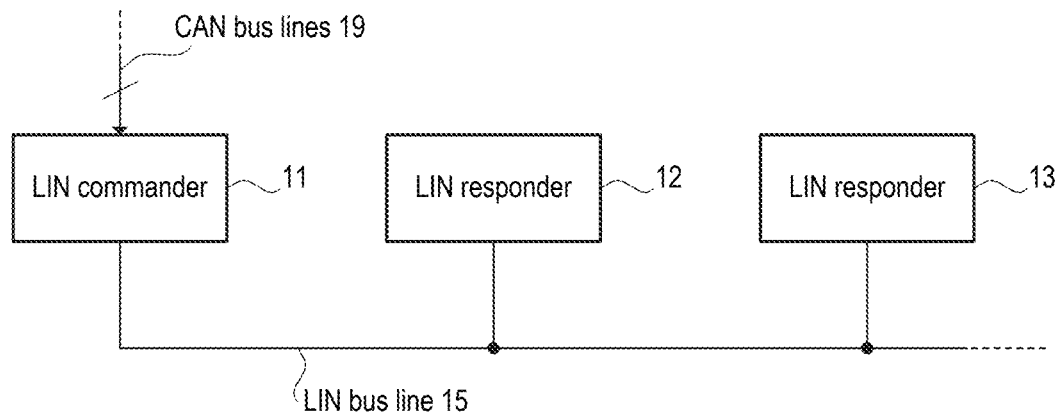
FIG. 1 illustrates a Local Interconnect Network (LIN bus system) with one commander node and (at least) two responder nodes.

FIG. 1 illustrates a Local Interconnect Network, which may also be referred to as LIN bus system. The network includes one commander node 11 and one or more responder nodes, in the depicted example responder node 12 and responder node 13. All network nodes are connected via a bus line 15. The commander node 11 is configured to execute the commander task and may, in addition thereto, also be configured to execute a responder task (like the responder nodes) and thus also operate as a responder. The basic structure of a LIN bus system and the required functions of commander and responder network nodes are as such known from the LIN specification and thus not further discussed herein.

The LIN commander node 11 may include a communication interface, which allows communication with other entities or subsystems. In the depicted example, the commander node 11 includes an interface to communicate with a Control Area Network (CAN) via CAN bus lines 19. Additionally or alternatively, the commander node may include (or be coupled with) any other source of data.

Figure 2:
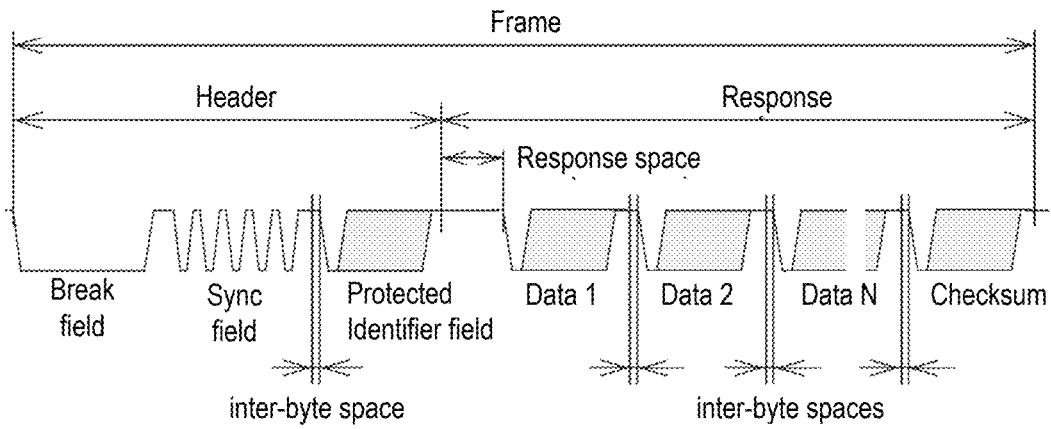
FIG. 2 illustrates the structure of a frame according to the LIN specification rev. 2.2A. The frame is composed of a header and a response.

FIG. 2 illustrates the structure of a LIN frame in accordance with the LIN specification rev. 2.2A. Accordingly, a frame is composed of two parts, a header part and a response part. For each frame, the header is generated by the commander node, whereas the response may be generated by the commander node 11 or a responder node. The header is composed of a Break field (see diagram (a) of FIG. 4), a Sync field (see diagram (b) of FIG. 4), and a Protected Identifier (PID) field.

The header starts at the falling edge of the break field and ends after the end of the stop bit of the protected identifier (PID) field. The response is composed of one or more data fields and a special data field including a check sum (checksum field). The response starts at the end of stop bit of the PID field and ends at the after the stop bit of the checksum field.

The inter-byte space is the time between the end of the stop bit of the preceding field and the start bit of the following byte. The response space is the inter-byte space between the PID field and the first data field of the response.

Figure 3:
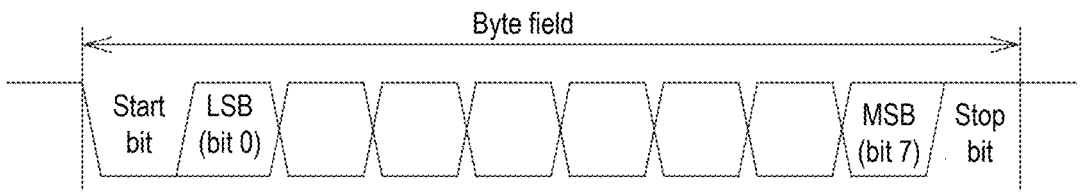
FIG. 3 illustrates the structure of a generic Byte field of a LIN frame.

FIG. 3 illustrates the structure of a generic Byte field of a LIN frame. Sync field, PID field, data fields and checksum field have the structure of a Byte field. That is, each field starts with a (dominant) start bit, followed by eight bits (bits 0-7), and ends with a (recessive) stop bit. A dominant bit has a low level (bit with value zero) and a recessive bit has a high level (bit with value one). Accordingly, the length of a Byte field corresponds to the length of ten bits.

Figure 4:
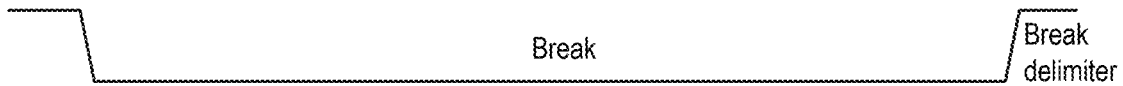
FIG. 4 illustrates the structure of a Break field of a LIN frame (diagram (a)) and a Sync Byte Field (diagram (b)).
Figure 4:

FIG. 4 shows two special fields, namely the Break field in diagram (a) and the Sync field (also referred to as Sync Byte field) in diagram (b). The break field is used to signal the beginning of a new frame. It is always generated by the commander node, and it is the only field that does not comply with the field structure shown in FIG. 3. As can be seen in FIG. 4, the Break field is longer than a normal Byte field. According to the specification, it is at least 13 nominal bit times long (with value zero) followed by a Break delimiter, which is at least one nominal bit time long (with value one). In other words, the Break field includes at least 13 dominant bits and the Break delimiter includes at least one recessive bit.

Normally, a responder node may use a break detection threshold of 11 (dominant) bit times. It is not required that a responder node checks that the break delimiter is at least one nominal bit time long. The Sync field is a normal Byte field having the value 85 (decimal) or 0b01010101 (binary). The most significant bit is bit 7.

A responder node should always be able to detect the break/sync field sequence, even if it expects a byte field (assuming the byte fields are separated from each other). When a break/sync field sequence occurs, the transfer in progress shall be aborted and processing of a new frame shall commence.

The PID field consists of two sub-fields, namely the frame identifier and the parity bits. Bits 0 to 5 are the frame identifier (possible values from 0-63) and bits 6 and 7 are the parity bits.

As mentioned, the header is generated (and output to the bus line) by the commander node, whereas the response is generated (and output to the bus line) by one of the responder nodes or by the commander node acting as responder. Situations may occur, in which a frame is incomplete. This may happen when none of the bus nodes outputs a response after a header, which may be a desired scenario in specific situations. An incomplete frame may also occur if—for whatever reason—a response is incomplete. For example, a responder node sending a response may be pre-empted by the commander node sending a new Break field (consisting of 13 dominant bits).

Figure 5:
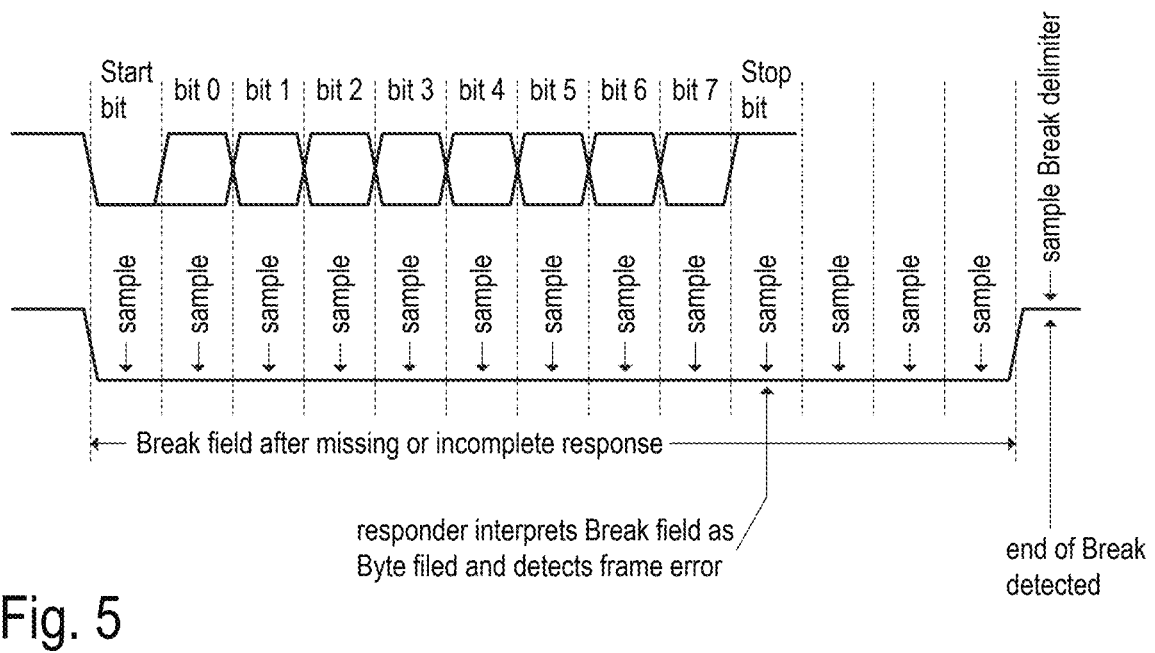
FIG. 5 illustrates a scenario, in which the bus commander sends a Break field of a new frame after an incomplete frame (with a missing or incomplete response). As a consequence, a frame error will be detected by a listening bus node.

FIG. 5 illustrates a scenario, in which the commander node sends a Break field of a new frame after an incomplete frame (with a missing or incomplete response). As a consequence, a frame error (stop bit error) will be detected by a listening bus node because it expects a data field. Assuming the scenario in which a second header is sent by the bus commander instead of waiting for a response, a listening responder node (not yet knowing that a second header is sent) will interpret the first (dominant) bit of the Break field of the second header as start bit of a data field and it will expect a (recessive) stop bit after receiving/detected eight bits (bits 0-7). However, as the Break field includes at least 13 dominant bits, the recessive stop bit does not occur. As a consequence, the listening responder node will signal a frame error (stop bit error) at the time the stop bit is expected. Only later, upon detection of the Break delimiter bit, the Break field (and thus the new header) is recognized as such.

The frame error explained above with reference to FIG. 5 can have two causes, namely a second header following a first header without a response in between and a second header interrupting the response following the first header. In some application there is a need to distinguish these two causes. A straight-forward approach to distinguish these two scenarios (missing response and incomplete response) may be to store the received bits in a buffer memory and to analyze the history of received bits upon occurrence of a stop bit error. However, such an approach complicates the circuitry of a responder node, and the embodiments described herein aim at a simpler solution which is discussed below with reference to FIG. 6.

Figure 6:
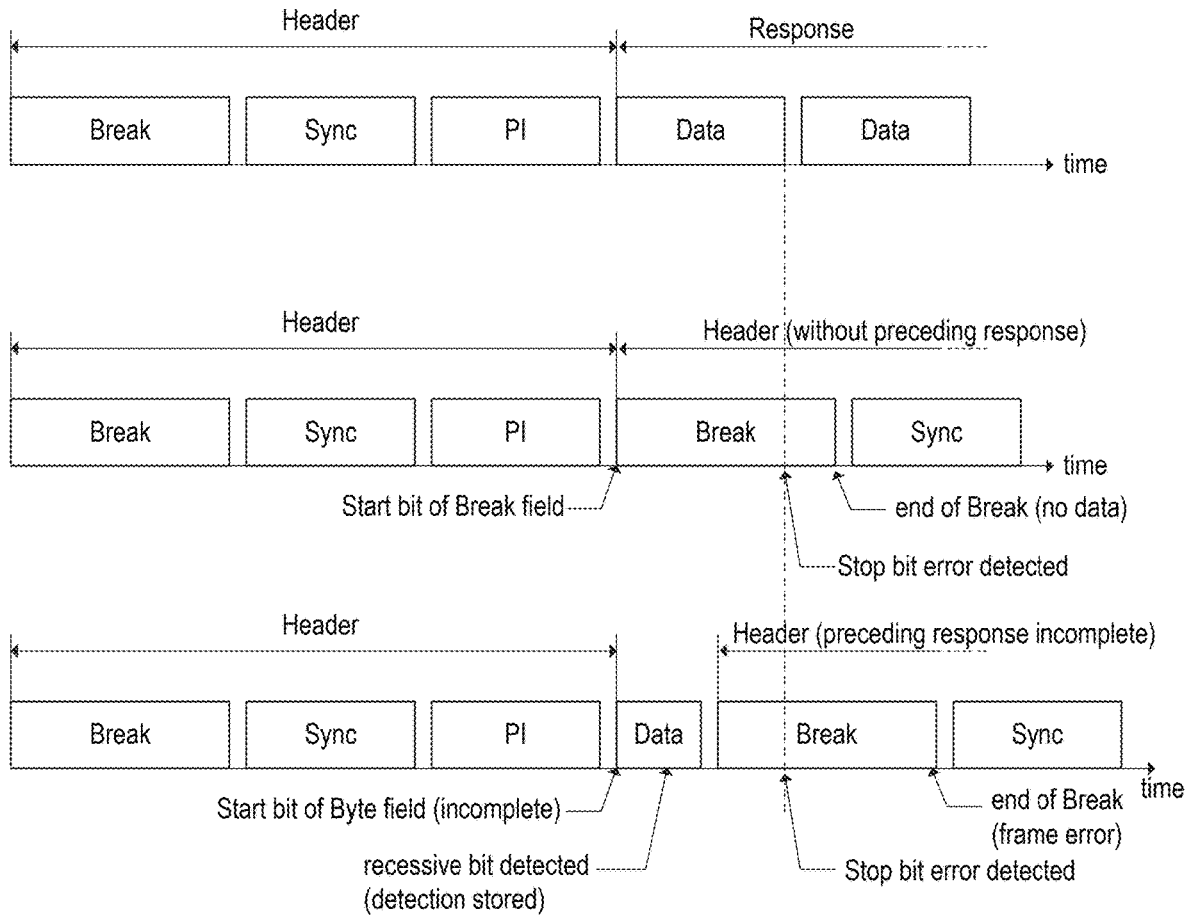
FIG. 6 illustrates how a listening bus node can be enabled to distinguish a frame error due to a missing response from a frame error due to an incomplete response.

The first (top) diagram of FIG. 6 schematically illustrates a normal frame with a header followed by a response, which includes several data fields and a trailing checksum field (not shown in FIG. 6). The second diagram of FIG. 6 illustrates a first header followed by a second header, which indicates the start of a new frame although no response is sent after the first header. The third (bottom) diagram of FIG. 6 illustrates a scenario similar to the one shown in the second diagram but with an incomplete response being sent after the first header. That is, the response sent after the first header is interrupted (for whatever reason) by the Break field of the second header.

In both scenarios (incomplete frames due to missing or incomplete response as shown in the second and third diagram of FIG. 6) a stop bit error is detected as discussed above with reference to FIG. 5. The frame error occurs because the responder expects a stop bit (which is always a recessive bit) at the end of a data field but, in fact, detects a dominant bit of the Break field of a new header. The embodiments described herein implement a mechanism that enables a responder to distinguish these two scenarios (missing response and incomplete response).

As can be seen in FIG. 6, second diagram, the start bit of the break field of the second header is, initially, interpreted as start bit of the first data field of a response. After receiving/detecting eight bits (bits 0-7), a responder node expects a (recessive) stop bit, which does not occur because the Break field of the second header always includes a sequence of at least 13 dominant bits. Therefore a frame error/stop bit error is signaled at the time the expected stop bot should have occurred. Only later, after at least 13 dominant bits, the responder is able to detect the Break delimiter and identify the sequence received so far as Break field of a new header. One can see from FIG. 6 (in connection with FIG. 5) that, after the reception of the first header, no recessive bit is received by a listening responder node until the sop bit error occurs. This is different in the second scenario, in which the response is not missing but incomplete, because it is interrupted by the new header.

If one or more data fields are received before the stop bit error occurs, at least one recessive bit will be received before occurrence of the stop bit error. Accordingly, when a listening bus node receives a response (or receives a bit sequence that is interpreted as response), it may set a flag upon reception of the first recessive bit. A flag is a one bit storage element and may be a dedicated bit stored in a register. Alternatively, a flag may be implemented as using a simple SR-latch (set-reset flip-flop). If the flag is set (indicated that a recessive bit has been detected before) at the time the Break delimiter is detected after the occurrence of a stop bit error, the listening bus can conclude that an incomplete response was received before the reception of the Break field, i.e. the previous response was interrupted by a new header.

The flag will not be set when the response is missing at all and a second header is sent directly after the first header (without an incomplete response in between). Therefore, by evaluating the flag, a listening bus node can distinguish the two scenarios (missing response, incomplete response) in a very easy way.

Figure 7:
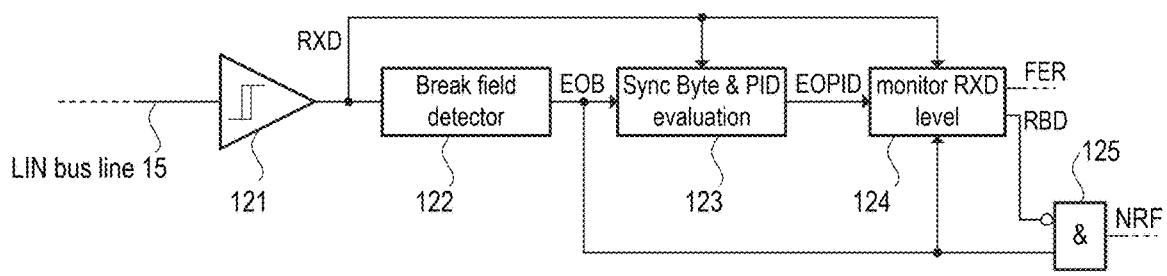
FIG. 7 illustrates a block diagram of a LIN bus responder node that is capable of detecting the cause of a frame error as shown in FIG. 6.

FIG. 7 illustrates a block diagram of a LIN bus responder node that is capable of receiving a frames and detecting the cause of a frame error as shown in FIG. 6. It is understood that FIG. 7 is a simplified block diagram, in which elements, which are as such known and not needed for the discussion of the embodiments, have been omitted in order to keep the drawings simple and easy to understand.

According to FIG. 7, the bus/network node includes a serial bus interface 121 configured to receive data from a serial bus interface. In the depicted example, the bus interface 121 is formed by a comparator. More complex interface circuits, which are as such known, may be used. The signal representing the received data is labelled RXD. The received data includes a plurality of data frames each of which includes at least a header.

The network node further includes a frame processor which, in the present example, includes the Break field detector 122, the sync byte and PID evaluator 123, the RXD level monitor 124 and an AND gate 125. It is understood that a skilled person will contemplate various other implementations of the frame processor, all of which performing substantially the same function. In accordance with one embodiment, the frame processor is configured to detect the completion of the reception of the first header. In the example of FIG. 7, this detection is performed by the Break field detector 122 and the sync byte and PID evaluator 123, wherein the logic signal EOPID provided by the sync byte and PID evaluator 123 signals the completion of the reception of a header (e.g. EOPID=1 signals the completion of reception of a header).

The frame processor is further configured to detect, whether the data received subsequent to the first header includes a recessive bit and store information that indicates whether or not a recessive bit has been detected. This detection is performed by the RXD level monitor 124, wherein the signal RBD provided by the RXD monitor 124 indicates that a recessive bit has been detected (e.g. RBD=1 indicates the detection of a recessive bit). The signal RBD may be an output signal of a latch included in the RXD level monitor 124. The latch may be reset (to output RBD=0) upon detection of a new PID field (e.g. signaled by EOPID).

Furthermore, the frame processor is configured to detect a stop bit in the data received subsequent to the first header. Moreover, the frame processor is configured to—in the event that the detection of the stop bit fails—detect a break delimiter that indicates (e.g., by EOB=1) the end of a break field of a second header, signal a frame error (e.g. FER=1 and NFR=0) if the stored information indicates that a recessive bit has been received (e.g. RBD=1), and signal a "no response frame" (e.g. NFR=1) if the stored information indicates that a recessive bit has not been received (e.g. RBD=0).

In the depicted example, the signal FER indicates (e.g. by FER=1) the occurrence of a stop bit error as discussed above with reference to FIGS. 5 and 6. The AND gate 125 generates, as output signal NFR, the conjunction RBD & EOB. The signal NFR is thus "1" when the Break field of a new header (sf. second header in FIG. 6) is received (EOB=1) and a recessive bit has not been detected (RBD=0). The signal/flag RBD is reset upon detection of a new frame (EOPID=1). That is, the monitor circuit 125 generates RBD=0 at the beginning of an (expected) response. If the "response" turns out to be a second header, this fact is indicated by NFR=1 at the output of the AND gate 125. Alternatively, if the response is interrupted by a second header, this fact is indicated by NFR=0 at the output of the AND gate 125.

Although the invention has been illustrated and described with respect to one or more implementations, alterations and/or modifications may be made to the illustrated examples without departing from the spirit and scope of the appended claims. In particular regard to the various functions performed by the above described components or structures (units, assemblies, devices, circuits, systems, etc.), the terms (including a reference to a "means") used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

The invention claimed is:

1. A method comprising:
receiving data from a serial bus interface, the data including a first header of a first data frame;
detecting completion of the reception of the first header;
detecting whether data received subsequent to the first header includes a recessive bit and storing information that indicates whether or not a recessive bit has been detected;
detecting a stop bit in the data received subsequent to the first header; and
when the detection of the stop bit fails:
detecting a break delimiter that indicates the end of a break field of a second header;
signaling a frame error if the stored information indicates that a recessive bit has been received; and
signaling a missing response if the stored information indicates that a recessive bit has not been received.

2. The method of claim 1,
wherein the serial bus interface is a Local Interconnect Network (LIN) interface.

3. The method of claim 1,
wherein, in the case that the detection of the stop bit fails, the data received until the break delimiter is interpreted as a break field of a second header, and
wherein the method further comprises receiving further data of the second header.

4. The method of claim 1,
wherein the information, which indicates whether or not a recessive bit has been detected, is stored in a latch.

5. The method of claim 1,
wherein receiving data from the serial bus interface starts with receiving a start bit.

6. The method of claim 1;
wherein the first header includes the break field, a synchronization field and a frame identifier field.

7. The method of claim 1;
wherein receiving data includes repetitively sampling bit values in synchronization with a clock signal.

8. The method of claim 7,
wherein the clock signal is synchronized using a synchronization field included in the first header.

9. A network node comprising,
a serial bus interface configured to receive data from a serial bus, the received data including a first header of a first data frame;

a frame processor configured to:
detect the completion of the reception of the first header;
detect whether the data received subsequent to the first header includes a recessive bit and store information that indicates whether, or not, a recessive bit has been detected;
detect a stop bit in the data received subsequent to the first header; and
    when the detection of the stop bit fails:
        detect a break delimiter that indicates the end of a break field of a second header;
        signal a frame error if the stored information indicates that a recessive bit has been received; and
        signal a missing response if the stored information indicates that a recessive bit has not been received.

10. The network node of claim 9,
wherein the serial bus interface includes a comparator.

11. The network node of claim 9,
wherein the serial bus interface is a Local Interconnect Network (LIN) interface.

12. The network node of claim 9, wherein the frame processor is further configured to:
    interpret the data received until the break delimiter as a break field of a second header in the case that the detection of the stop bit fails, and, subsequently,
    receive further data of the second header.

13. The network node of claim 9,
wherein the frame processor includes a latch for storing the information, which indicates whether or not a recessive bit has been detected.

14. The network node of claim 9,
wherein the first header includes the break field, a synchronization field and a frame identifier field.

15. The network node of claim 9,
wherein, fore receiving data, the frame processor is configured to repetitively sample bit values in synchronization with a clock signal.

* * * * *